US008336508B2

(12) United States Patent
Huttner

(10) Patent No.: US 8,336,508 B2
(45) Date of Patent: Dec. 25, 2012

(54) SYSTEM AND METHOD FOR USE WITH A COMBUSTION ENGINE

(76) Inventor: Timothy Huttner, Champlin, MN (US)

( * ) Notice: Subject to any disclaimer, the term of this patent is extended or adjusted under 35 U.S.C. 154(b) by 459 days.

(21) Appl. No.: 12/561,822

(22) Filed: Sep. 17, 2009

(65) Prior Publication Data

US 2010/0064989 A1    Mar. 18, 2010

Related U.S. Application Data

(60) Provisional application No. 61/097,636, filed on Sep. 17, 2008.

(51) Int. Cl.
F02B 43/08    (2006.01)

(52) U.S. Cl. .................. 123/3; 123/1 A; 123/DIG. 12; 123/536

(58) Field of Classification Search ............ 123/1 A, 123/3, 536, DIG. 12, DIG. 13
See application file for complete search history.

(56) References Cited

U.S. PATENT DOCUMENTS

| | | |
|---|---|---|
| 3,648,668 A | 3/1972 | Pacheco |
| 3,985,107 A | 10/1976 | Ueno |
| 4,003,204 A | 1/1977 | Bradley |
| 4,023,545 A | 5/1977 | Mosher |
| 4,078,535 A | 3/1978 | Shafer |
| 4,099,489 A | 7/1978 | Bradley |
| 4,125,090 A | 11/1978 | Masunaga |
| 4,185,593 A | 1/1980 | McClure |
| 4,271,793 A | 6/1981 | Valdespino |
| 4,326,483 A | 4/1982 | Lowther |
| 4,332,219 A | 6/1982 | Gonzalez |
| 4,344,831 A | 8/1982 | Weber |
| 4,380,970 A | 4/1983 | Davis |
| 4,389,981 A | 6/1983 | Meyer |
| 4,411,223 A | 10/1983 | Kiely |
| 4,442,801 A | 4/1984 | Glynn |
| 4,763,610 A | 8/1988 | Thomas |
| 4,773,981 A | 9/1988 | Bidwell |
| 5,159,900 A | 11/1992 | Dammann |
| 5,178,118 A | 1/1993 | Nakamats |
| 5,231,954 A | 8/1993 | Stowe |
| 5,305,715 A | 4/1994 | Nissley |
| 5,399,251 A | 3/1995 | Nakamats |
| 5,452,688 A * | 9/1995 | Rose ................................ 123/3 |
| 5,458,095 A | 10/1995 | Post |
| 5,488,932 A | 2/1996 | Serafini |
| 5,513,600 A | 5/1996 | Teves |
| 6,209,493 B1 | 4/2001 | Ross |
| 6,257,175 B1 | 7/2001 | Mosher |
| 6,311,648 B1 | 11/2001 | Larocque |

(Continued)

Primary Examiner — Noah Kamen
Assistant Examiner — Hung Q Nguyen
(74) Attorney, Agent, or Firm — Seager, Tufte & Wickhem LLC

(57) ABSTRACT

A system for use with a combustion engine having an air intake, sensors and an engine control module, comprising a hydrogen cell capable of turning water into hydrogen and oxygen gases and a controller electrically connected to the sensors, the engine control module and the hydrogen cell, wherein the controller is programmed to ratiometrically skew one or more signal inputs to the engine control module to control the engine in response to predetermined signal levels, wherein the controller is programmed to activate the hydrogen cell in response to predetermined signal levels, wherein the hydrogen cell is fluidly connected to the engine through the air intake, and wherein the controller is programmed to cause the engine control module to reduce the rate of fuel flow to the engine and to activate the hydrogen cell simultaneously.

12 Claims, 7 Drawing Sheets

U.S. PATENT DOCUMENTS

| | | |
|---|---|---|
| 6,314,918 B1 | 11/2001 | McFarland |
| 6,314,919 B1 | 11/2001 | Pugachev |
| 6,332,434 B1 | 12/2001 | De Souza |
| 6,336,430 B2 | 1/2002 | De Souza |
| 6,659,049 B2 | 12/2003 | Zagaja |
| 6,698,190 B2 | 3/2004 | Docter |
| 6,739,289 B2 | 5/2004 | Hiltner |
| 6,779,337 B2 | 8/2004 | Tang |
| 6,796,387 B1 | 9/2004 | Lund |
| 6,817,320 B2 | 11/2004 | Balan |
| 6,851,398 B2 | 2/2005 | Taylor, III |
| 7,100,542 B2 | 9/2006 | Ehresman |
| 7,191,737 B2 | 3/2007 | Klein |
| 7,241,429 B2 | 7/2007 | Greathouse |
| 7,357,102 B1 | 4/2008 | Lin |
| 7,401,578 B2 | 7/2008 | Otterstrom |
| 7,552,702 B2 | 6/2009 | Stone |
| 7,578,911 B2 | 8/2009 | Nweke |
| 7,654,232 B2 | 2/2010 | Ishimaru |
| 2001/0013321 A1 | 8/2001 | Knowlton |
| 2002/0117124 A1 | 8/2002 | McMaster |
| 2003/0024489 A1 | 2/2003 | Balan |
| 2003/0141113 A1 | 7/2003 | Krill |
| 2003/0159663 A1 | 8/2003 | Zagaja |
| 2003/0168023 A1 | 9/2003 | Anderson |
| 2003/0200939 A1 | 10/2003 | Hiltner |
| 2004/0025807 A1 | 2/2004 | Jhetham |
| 2004/0025808 A1 | 2/2004 | Cheng |
| 2005/0126515 A1 | 6/2005 | Balan |
| 2005/0224042 A1 | 10/2005 | Shinagawa |
| 2005/0229872 A1 | 10/2005 | Lange |
| 2006/0090712 A1 | 5/2006 | Ehresman |
| 2006/0180101 A1 | 8/2006 | Monette |
| 2007/0012264 A1 | 1/2007 | Holt |
| 2007/0157911 A1 | 7/2007 | Richardson |
| 2007/0215070 A1 | 9/2007 | Yatsenko |
| 2008/0047502 A1 | 2/2008 | Morse |
| 2008/0092830 A1 | 4/2008 | Suzuki |
| 2008/0092831 A1 | 4/2008 | Simon |
| 2008/0110419 A1 | 5/2008 | Sakurai |
| 2008/0190383 A1 | 8/2008 | Lin |
| 2008/0256933 A1 | 10/2008 | Black |
| 2008/0257285 A1 | 10/2008 | Motouchi |
| 2009/0120414 A1 | 5/2009 | Hallenbeck |
| 2009/0139469 A1 | 6/2009 | Cerny |
| 2009/0183695 A1 | 7/2009 | Donnelly |
| 2009/0193781 A1 | 8/2009 | Haase |
| 2009/0194042 A1 | 8/2009 | Workman |
| 2009/0283059 A1 | 11/2009 | Tewari |

\* cited by examiner

Fig. 4

SYSTEM AND METHOD FOR USE WITH A COMBUSTION ENGINE

This application claims the benefit of U.S. Provisional Ser. No. 61/097,636 filed Sep. 17, 2008.

FIELD OF THE INVENTION

The invention pertains to a system and method for altering fuel-based engines such as internal combustion engines for increased fuel efficiency.

BACKGROUND

Eighty to ninety percent of the energy consumed worldwide is derived from fossil fuels, of which there are finite proven recoverable reserves. Further, the consumption and production of energy continues to grow worldwide year after year. In the United States, the magnitude of the importation of fossil fuels, both as a percentage and in terms of raw numbers, impacts many of the most pressing issues, including national security, geopolitics, the trade deficit, the economy and the environment. One way to help slow the growth in fossil fuel consumption or perhaps even to reduce fossil fuel consumption is to produce energy more efficiently or, in other words, to produce more energy per unit of fuel. There is thus a strong need to find ways to more efficiently use fossil fuels.

SUMMARY

At a high level of abstraction, embodiments of the invention pertain to methods of using the byproducts of the electrolysis of water (2H2 and O2) as an oxidizer (the O2) and additional fuel (the H2) to increase the efficiency of a computer-controlled fuel-powered combustion-based engine by supplementing the air intake into the engine with a controlled amount of the (2H2+O2) gas and optionally by controlling the other inputs (e.g. fuel, air) into the engine, and systems for implementing the method.

This process will be described with reference to internal combustion engines such as a conventional 4-stroke automobile engine. But as will become apparent, the method is well suited for use with any fuel-based engine. The system and method may be used with any internal or external combustion engine such as 2-stroke, 4-stroke, 6-stroke, diesel, Wankel, jet, Wankel, and Stirling engine, for example. Further, a system and method according to the invention may be used with any type of fuel where energy is produced by a chemical reaction with oxygen. Such fuels include but are not limited to gasoline or petroleum, oil, natural gas, biomass derived fuel, vegetable oil, ethanol fuel, alcohol fuel, methanol fuel, fuel oil, coal oil, jet fuel, rocket fuel, kerosene. Solid fuels such as but not limited to coal, charcoal, peat, fuel pellets made from Hexamine, wood, corn, wheat, rye or other grains, solid rocket fuel and the like are also suitable for use with a system and method according to the invention.

Some embodiments of the invention pertain to a system and method that may be used with an existing engine and may be integrated with the existing engine easily in, for example, an after-market or original equipment manufacture (OEM) application. The system may include a computer control module that may be inserted electrically between one or more of the engine system sensors and the engine control module and a hydrogen cell for breaking water into hydrogen and oxygen gases. The hydrogen cell is electrically connected to the control module and is also connected to the air intake system where gases produced by the hydrogen cell are introduced into the engine. The system may have an "off" condition where the hydrogen cell is inactive and where the computer control module sends the engine system sensor signals to the engine control module unaltered. In such a phase, the engine control module runs the engine and associated components according to the manufacturer's preset conditions and programs. The system may also be active. When the system is active, the system may monitor one or more signal inputs to the computer control module and alter one or more of the signals sent to the engine control module to thereby alter one or more inputs (such as fuel) to the engine. The computer control module may also activate, in whole or part, the hydrogen cell to add oxygen and hydrogen to the engine's combustion process. The computer control module monitors the signals to make necessary adjustments to its signal skewing functions and hydrogen cell activation function. Such a system will be described in further detail below.

BRIEF DESCRIPTION OF DRAWINGS

FIG. 4 depicts two tables according to one aspect of the invention.

DETAILED DESCRIPTION OF THE DRAWINGS

Figure 1:
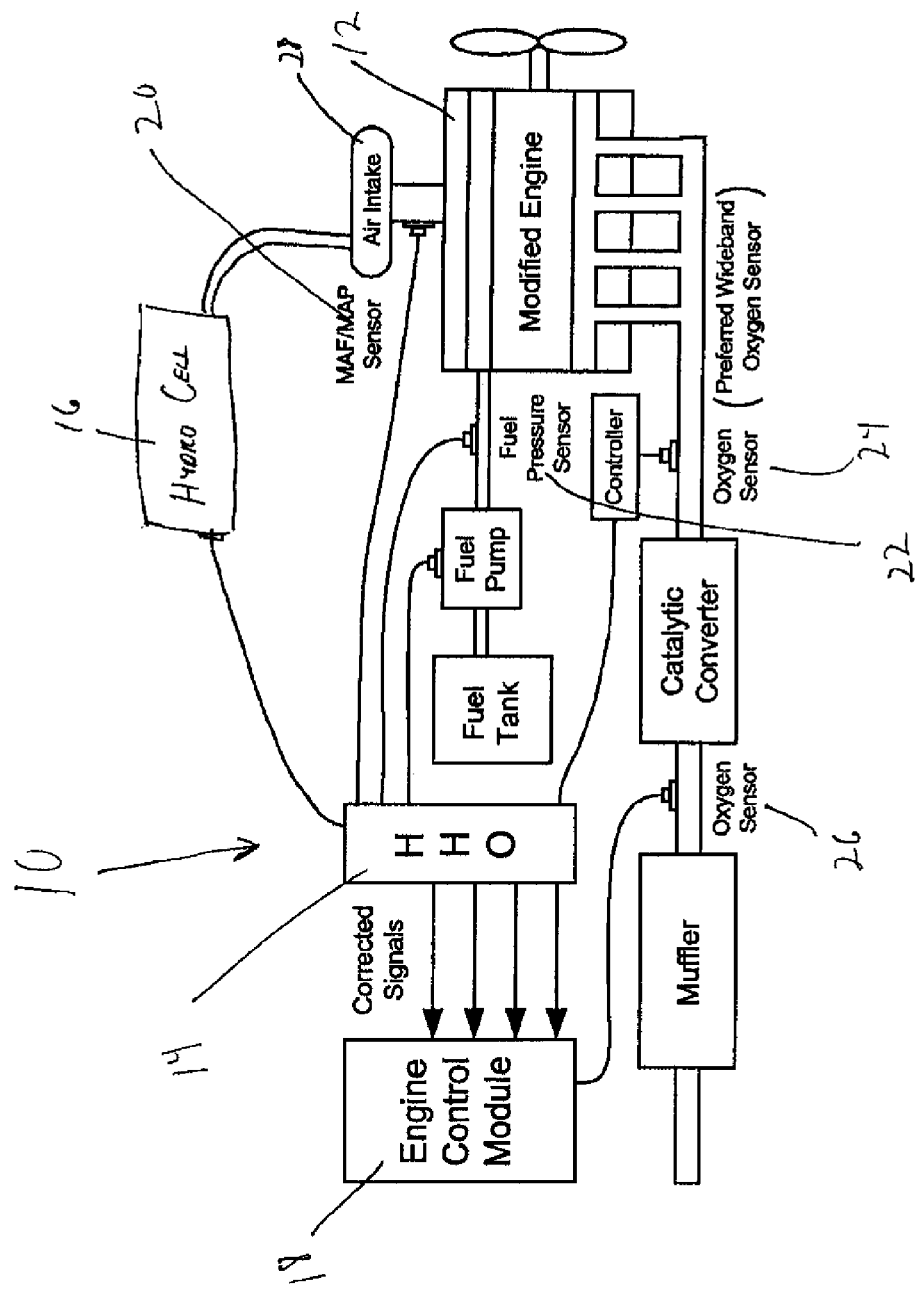
FIG. 1 is a diagram of a system 10 according to one aspect of the invention integrated into a convention automobile.

In an example, the use of a system 10 according to one embodiment of the invention will be described with reference to the diagram of FIG. 1. A conventional automobile (not shown) with a four-stroke engine 12 is fitted with the system 10 as described below. System 10 includes a controller 14 and a hydrogen cell 16. The controller 14 is interposed between various sensors and the engine control module 18. These sensors may include MAF/MAP sensor 20, fuel pressure sensor 22, and oxygen sensor 24. Other sensors, such as oxygen sensor 26 may be connected to the engine control module 18 according to the automobile manufacturer's original specifications. Signals from sensors 20, 22 and 24 are inputted into controller 14 and are passed on to engine control module 18. These signals may be passed through in an unaltered state or they may be skewed by the controller 14 as described below. The controller 14 is also operatively connected to hydrogen cell 16.

Figure 2:
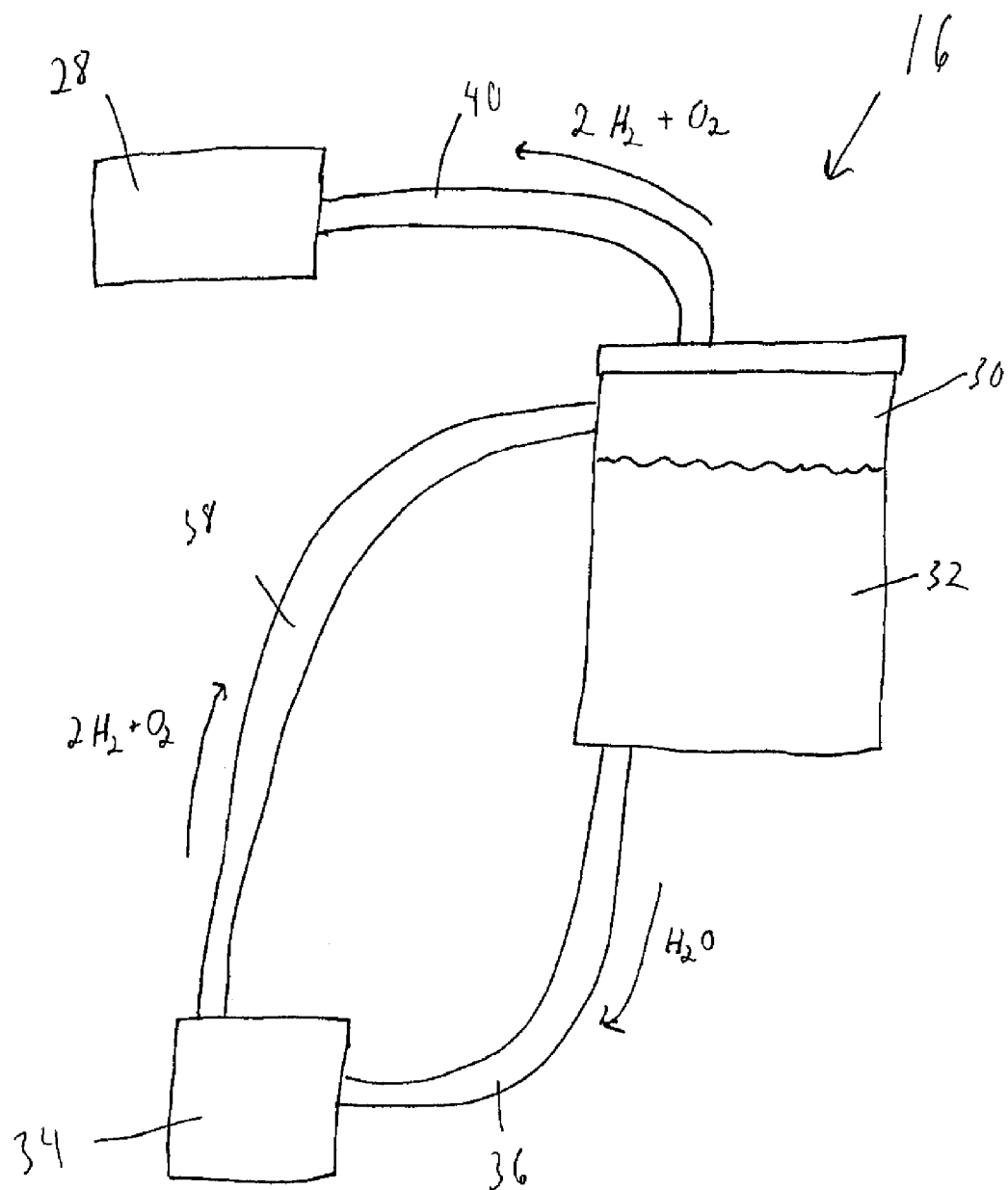
FIG. 2 is a diagram of a hydrogen cell 16 according to one aspect of the invention.

Hydrogen cell 16 is depicted in greater detail in FIG. 2 and consists of a tank 32 and a chemical reactor 34. Water, preferably purified water is put in tank 32 for use in chemical reactor 34. One or more catalysts such as potassium hydroxide may be added to the water to facilitate the reaction. The water may be gravity fed through hose 36 to chemical reactor 34 where it is broken into hydrogen and oxygen gases. These gases may be fed back through hose 38 to tank 30 where any liquid or catalyst residue may drop back into the tank. The hydrogen and oxygen gases are then fed through hose 40 to air intake 28 of the engine. This is merely one exemplary arrangement for hydrogen cell 16. Any cell suitable for breaking water down chemically into hydrogen and oxygen gases may be used. For example, a hydrogen cell where hose 38 leads directly from reactor 34 to air intake 28 may be suitable. Non-reactive antifreeze agents may be added to the water mixture or a suitable antifreeze or warming system may be incorporated to extend the operating conditions of the system. The capacity of the hydrogen cell may be increased by selecting components with higher ratings or by connecting, for example, two or more reactors in parallel or other suitable arrangement.

Figure 3:
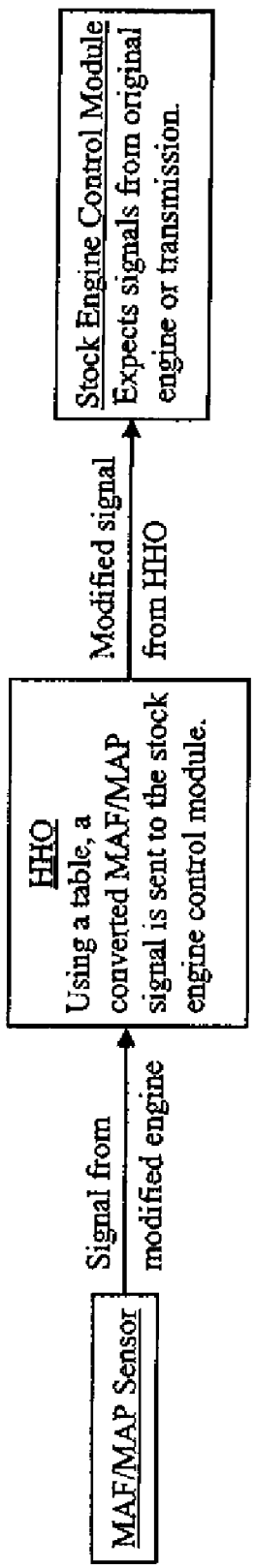
FIG. 3 is a flow chart illustrating a signal modification process according to one aspect of the invention.

Turning now to FIG. 3, a flow chart depicting the operation of the controller 14 is depicted. A signal such as a signal from the MAF/MAP sensor is received by the controller. One or more such signals may be received by the controller. Any sensor may be connected to the controller to send its signal to the control. Such sensors depend on the particular engine or combustion system being modified by a system according to the invention. Sensors may include Mass Air Flow sensor (MAF), Manifold Air Pressure sensor (MAP), Throttle Position Sensor (TPS), temperature sensors, oxygen sensors, speed sensors, fuel pressure, temperature sensors such as a coolant temperature sensor, engine revolutions per minute (RPM), air fuel ratio (AFR), vehicle speed sensor (VSS) and so on. The controller may also be connected to the computer area network (CAN). The signals from the one or more sensors are processed in the controller using a predetermined algorithm, and a signal, which may be modified or unmodified, is sent on to the engine control module and/or to the hydrogen cell. Whether the signal is modified depends on the sensor values received and the process determined by the algorithm. One preferred algorithm includes using tables as described below.

Figure 4:
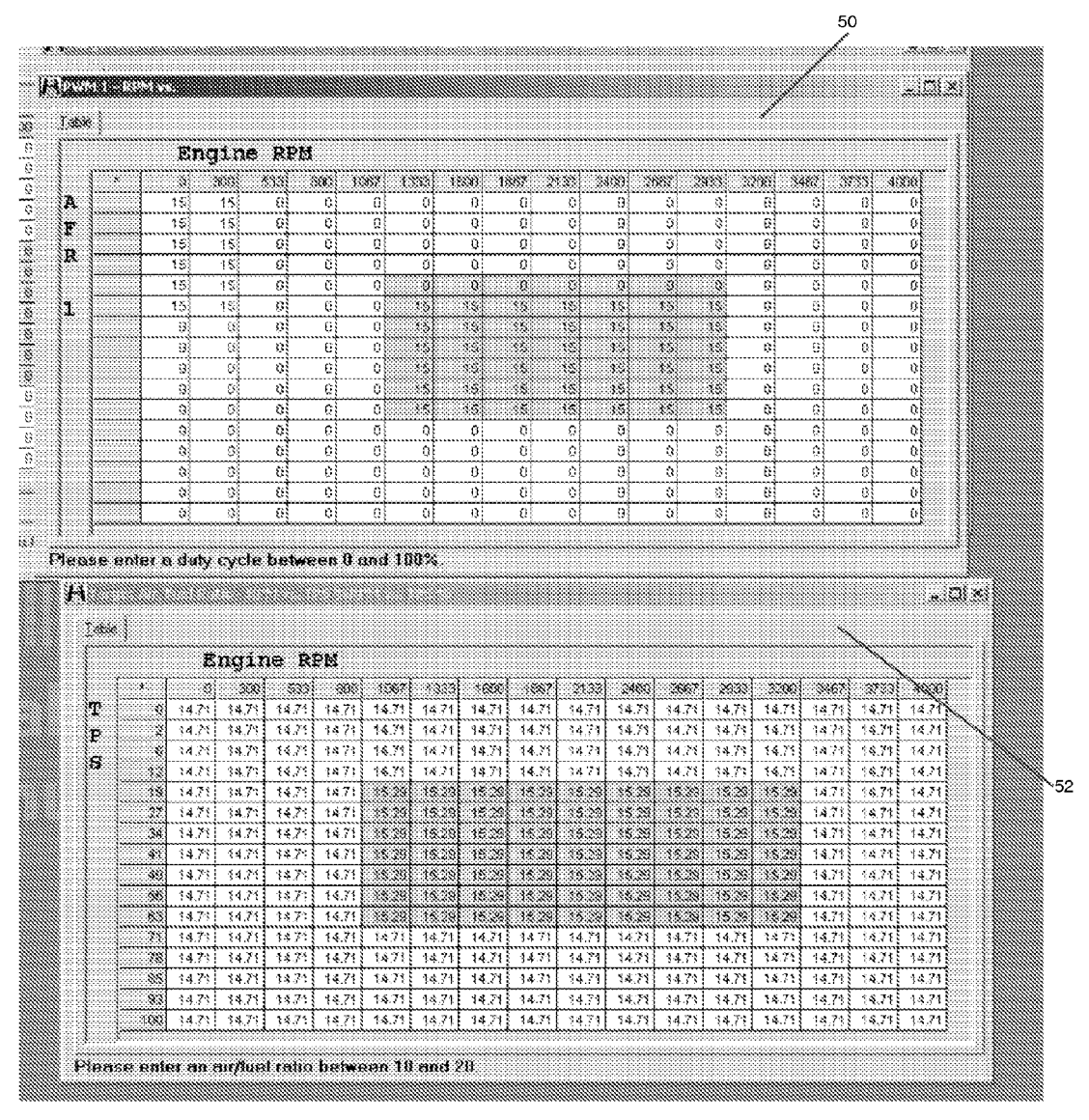

In one preferred controller programming method, whether and when signals are modified is determined through the use of tables. For example, in table 50 depicted in FIG. 4, the inputs are engine RPM and air/fuel ratio (AFR). The output may be a signal sent to the hydrogen cell. The signal may be a scaled value between 0 and 100, where an output of 0 results in the hydrogen cell not running and an output of 100 represents running the hydrogen cell at full capacity. An output of 33, for example, would result in the hydrogen cell running at ⅓ capacity. In table 52, the inputs are engine RPM and throttle position sensor (TPS) and the output may be target air/fuel ratio (AFR). The AFR is sent on to the engine control module. In the particular example of this table, the AFR values are stochiometric air-fuel ratios. In this manner, the engine control module may think that the engine is running rich (too much fuel) or lean (too little fuel) and adjust the fuel supplied accordingly. Any number of tables may be set up. The inputs of the tables may be inputs from sensors or may be outputs from one or more other tables. For example, the AFR input of table 50 may be the output of table 52. The output value in the table may be a ratiometric value. In other words, the output may be expressed as a ratio of a selected input. If for example, the output value was expressed ratiometrically as 1.2, then an input signal indicated 10 volts would result in an output signal of 12 volts. In this manner, the engine 12 may be controlled through the stock engine control module. The programming of the engine control module is not altered, only the inputs to the engine control module. Thus the car may be returned to it stock running state by passing unaltered signals through the controller 14 and by not running the hydrogen cell 16. The controller 14 may be programmed using a laptop or other computer and may include a software monitor showing all the inputs and outputs.

Figure 5:
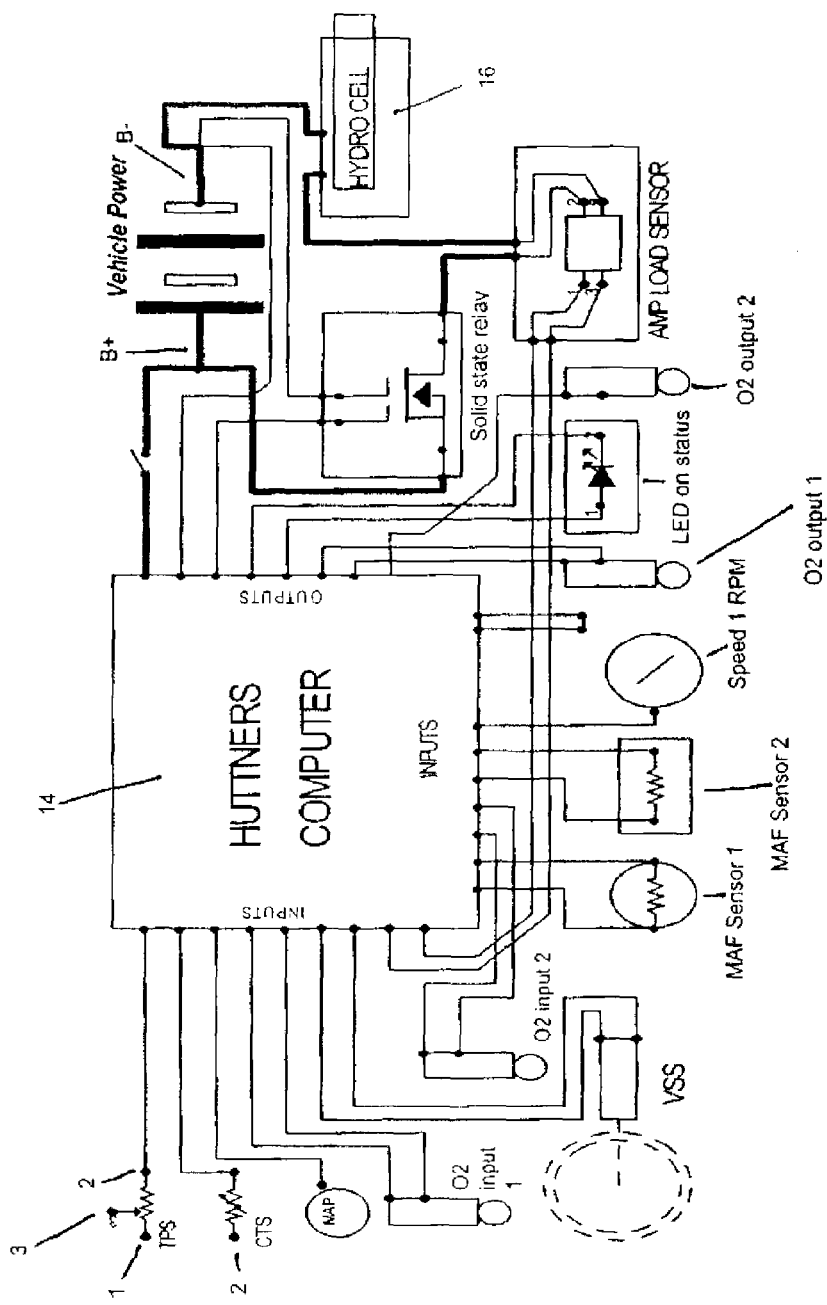
FIG. 5 depicts an electrical schematic of the connections to a controller 14 in one embodiment.
Figure 6:
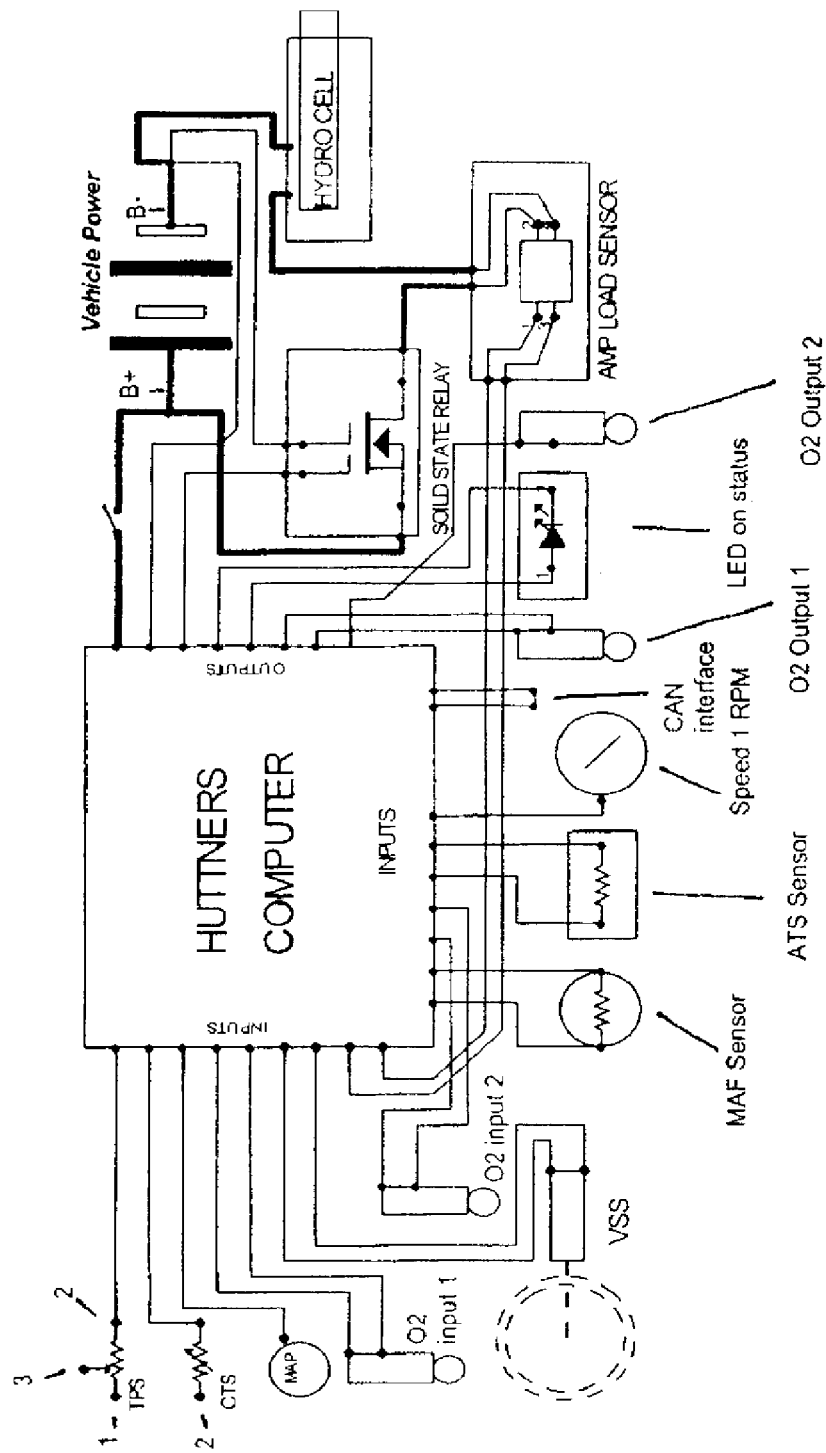
FIG. 6 depicts an electric schematic of the connections to a controller 14 in another embodiment.

FIGS. 5 and 6 depict two alternative electrical schematics for connected a controller 14 and hydrogen cell 16 to an electrical harness.

Figure 7:
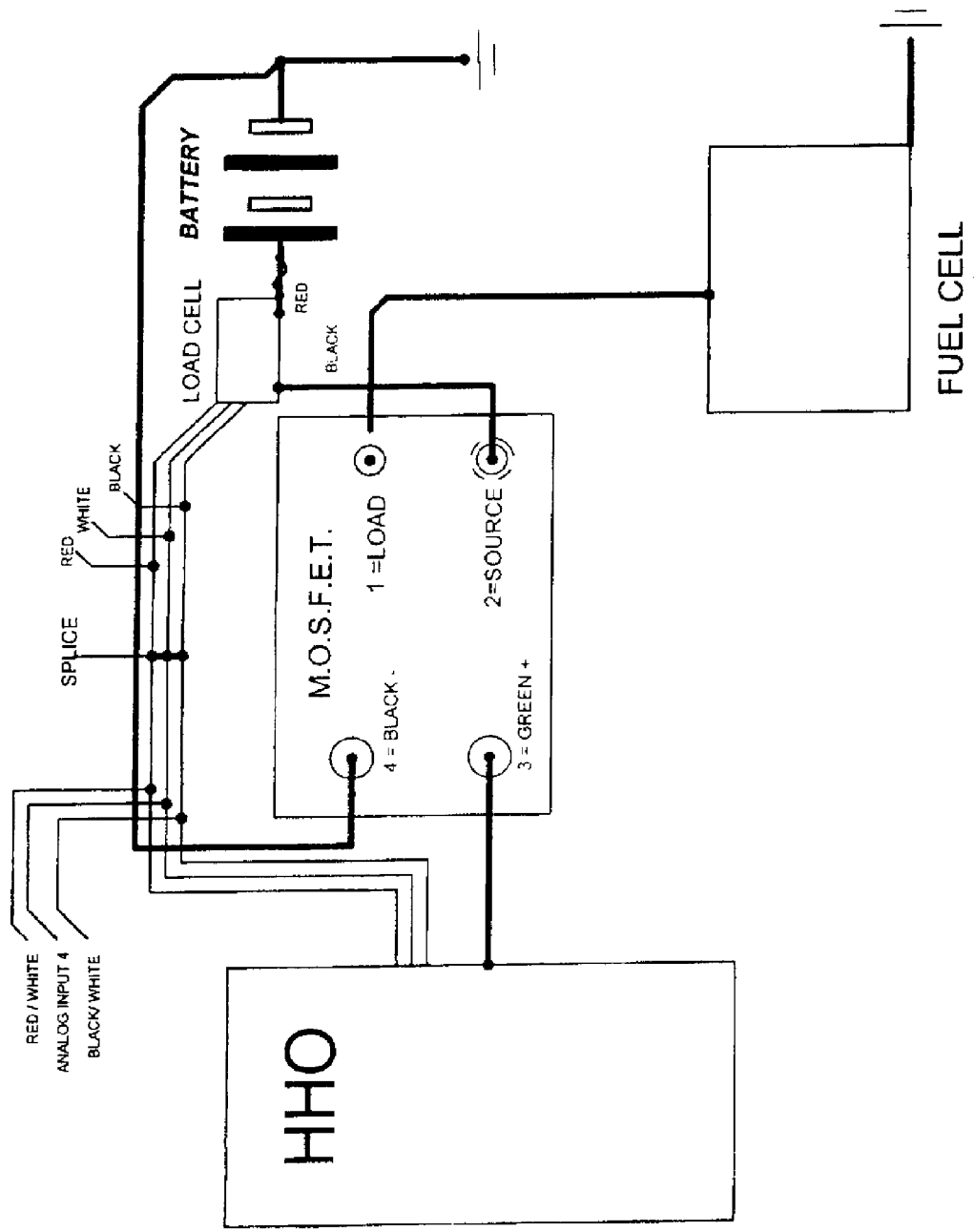
FIG. 7 depicts the use of a mosfet according to one aspect of the invention.

FIG. 7 depicts an electrical schematic where a mosfet (metal oxide semiconductor field effect transistor) is used in conjunction with the controller. The use of a mosfet may be desirable or necessary where a particular controller cannot handle the load of a particular signal. By using a mosfet, the controller can still control the signal while avoiding exposing the controller to the full load of the signal. The system may also contain a load cell, or amp load sensor, which sends a signal to the controller regarding the amount of amperage being drawn by the hydrogen cell. The controller may monitor the amount of amperage. If the amperage is, for example, less than expected or less than expected by a predetermined amount, then the controller may send a status message indicating that the hydrogen cell needs service. Such service may involve adding water, potassium hydroxide or other chemicals to regenerate the hydrogen cell. Other arrangements are also known in the art.

As described above, the controller is situated electrically between the engine sensors and the engine control module and is also electrically connected to the hydrogen cell to control the rate of gas output from the hydrogen cell. In use, initially, the controller passes the signals from the engine to the engine control module without altering them. Once the engine is running, the controller activates the Hydro Cell and begins to control the engine. The controller does not directly control the engine, but rather controls the engine through the engine control module by altering the signals sent to the car's computer. At certain predetermined levels from sensors such as the RPM sensor and the throttle position sensor, the controller sends signals to the engine though the engine control module that are skewed to cause the car's computer to throttle (or cut back) the rate of fuel flow to the engine while also sending a signal to the hydrogen cell to increase hydrogen and oxygen production rate and flow. The hydrogen and oxygen may be introduced into the engine through the air intake. This results in the engine burning an oxygen and hydrogen rich air-fuel mixture that results in more power produced per unit fuel. The fuel rate is preferably reduced because the desired result is not more power per se, but rather a higher efficiency at a given throttle position. When the system is used with an automobile as described above, the higher efficiency may be measured in miles per gallon or kilometers per liter.

In another example use, the system may be integrated into a power generating turbine where the desired result is maximum power output. In such a case, there may be no desire to throttle the fuel rate but merely to introduce the hydrogen and oxygen gases from the hydrogen cell into the combustion process to increase the fuel use efficiency.

In another example use, the system is integrated by the manufacturer and is part of the OEM equipment. In such an application, the functions of the controller and the engine control module may be integrated into a single computer control system.

It can readily be seen that this system may be adapted for use with any combustion process for use with any number of applications. In each application, one can customize and optimize the system by creating tables having desired inputs and outputs as described above. The particular inputs and outputs and the optimal output values are dependent on the particular application.

What is claimed is:

1. A system for use with a combustion engine having an air intake, sensors and an engine control module, comprising:
    a hydrogen cell capable of turning water into hydrogen and oxygen gases; and
    a controller electrically connected to the sensors, the engine control module and the hydrogen cell, wherein the controller is programmed to skew one or more signal inputs to the engine control module to control the engine in response to predetermined signal levels, wherein the controller is programmed to activate the hydrogen cell in response to predetermined signal levels, and wherein the hydrogen cell is fluidly connected to the engine through the air intake.

2. The system of claim 1 wherein the controller is programmed to cause the engine control module to reduce the rate of fuel flow to the engine and to activate the hydrogen cell simultaneously.

3. The system of claim 1 wherein the controller is programmed through the use of one or more tables.

4. The system of claim 3 wherein the one or more tables includes at least 10 rows and 10 columns.

5. The system of claim 1 wherein the controller is configured to skew signals ratiometrically.

6. The system of claim 1 further comprising an amperage load sensor configured to measure the amperage drawn by the hydrogen cell, wherein the controller is configured to monitor the amperage load sensor.

7. The system of claim 1 comprising a field effect transistor electrically integrated such that the hydrogen cell is controlled by the controller through the use of the field effect transistor.

8. The system of claim 7 wherein the field effect transistor is a metal oxide semiconductor field effect transistor.

9. The system of claim 1, wherein the engine control module is configured to be interposed between the sensors and the controller.

10. A motor vehicle having a combustion engine having an air intake, an MAF/MAP sensor, a fuel pressure sensor, a first oxygen sensor and an engine control module, comprising:

a hydrogen cell capable of turning water into hydrogen and oxygen gases; and a controller electrically connected to the sensors, the engine control module and the hydrogen cell, wherein the controller is interposed between the MAF/MAP sensor and the engine control module, such that a signal input from the MAF/MAP sensor travels through the controller to the engine control module, wherein the controller is programmed to skew one or more signal inputs to the engine control module to control the engine in response to predetermined signal levels, wherein the controller is programmed to activate the hydrogen cell in response to predetermined signal levels, and wherein the hydrogen cell is fluidly connected to the engine through the air intake.

11. The motor vehicle of claim 10 wherein the controller is interposed between the fuel pressure sensor and the engine control module, such that a signal input from the fuel pressure sensor travels through the controller to the engine control module, and wherein the controller is interposed between the first oxygen sensor and the engine control module, such that a signal input from the first oxygen sensor travels through the controller to the engine control module.

12. The motor vehicle of claim 11 wherein the engine further comprises a second oxygen sensor and wherein the second oxygen sensor is connected to the engine control module such that a signal from the second oxygen sensor does not travel through the controller.

* * * * *